United States Patent [19]

Nakasu et al.

[11] 4,392,560
[45] Jul. 12, 1983

[54] DISC BRAKE WITH A CALIPER SUPPORTED BY SLIDE PINS

[75] Inventors: Kei Nakasu; Shigeru Ichikawa; Toshihiko Tanaka, all of Toyota; Mitsuo Ikeda, Chiryu, all of Japan

[73] Assignees: Toyota Jidosha Kogyo Kabushiki Kaisha; Aisin Seiki Kabushiki Kaisha, both of Aichi, Japan

[21] Appl. No.: 273,321

[22] Filed: Jun. 15, 1981

[30] Foreign Application Priority Data

Jul. 2, 1980 [JP] Japan .................. 55-92954[U]

[51] Int. Cl.³ .......................................... F16D 65/09
[52] U.S. Cl. ............................. 188/73.34; 188/73.45
[58] Field of Search ............. 188/73.33, 73.34, 73.44, 188/73.45, 73.46, 72.4

[56] References Cited

U.S. PATENT DOCUMENTS

| | | | |
|---|---|---|---|
| 3,194,351 | 7/1965 | Swift | 188/72.4 |
| 3,656,590 | 4/1972 | Newstead | 188/73.45 |
| 4,022,303 | 5/1977 | Kondo et al. | 188/73.45 |
| 4,034,857 | 7/1977 | Kondo et al. | 188/73.45 |
| 4,319,670 | 3/1982 | Oka et al. | 188/73.34 |
| 4,331,221 | 5/1982 | Evans et al. | 188/73.44 |
| 4,334,599 | 6/1982 | Ritsema et al. | 188/73.45 |

FOREIGN PATENT DOCUMENTS

| | | | |
|---|---|---|---|
| 2850439 | 5/1979 | Fed. Rep. of Germany | 188/73.45 |
| 52-63563 | 5/1977 | Japan | 188/73.45 |
| 54-53761 | 4/1979 | Japan | 188/73.45 |
| 2058969 | 4/1981 | United Kingdom | 188/73.45 |

*Primary Examiner*—Douglas C. Butler
*Assistant Examiner*—R. R. Diefendorf
*Attorney, Agent, or Firm*—Parkhurst & Oliff

[57] ABSTRACT

A disc brake wherein a caliper having a fluid pressure cylinder portion and a reaction portion for urging a pair of pad assemblies onto a disc rotor is shiftably retained by four slide pins. The slide pins are erected from a torque receiving member, one pair on either side of the disc rotor. Respective two slide pins projecting perpendicularly away from the rotor on opposite sides thereof are positioned co-axially to each other. At least one of the four slide pins disposed on the side with the cylinder portion is made into a main slide pin for chiefly regulating the shifting direction of the caliper; and the remaining three slide pins are respectively made into auxiliary slide pins with less capability for regulating the shifting direction than the main slide pin.

16 Claims, 2 Drawing Figures

DISC BRAKE WITH A CALIPER SUPPORTED BY SLIDE PINS

BACKGROUND OF THE INVENTION

The present invention relates to a disc brake of a type wherein a caliper for urging a pair of pad assemblies (hereinafter simply called pads) onto a disc rotor, while being carried by slide pins erected from a torque member, is shifted in a parallel direction to the axis of the disc rotor.

In most of this type of disc brakes a pair of slide pins is disposed on one side of the disc rotor. In medium and large size vehicles, however, the guide length of the slide pins is required to be fairly large, because the weight of the caliper is remarkably increased. The size of the wheels is not increased in proportion to the weight increase of the caliper, so the slide pins are sometimes largely projected out of the disc wheel, bringing about a disadvantage.

Against this problem a proposition was made to span the slide pins extending over the outer periphery of the disc rotor for supporting the caliper. In this structure the slide pins are liable to be directly exposed to heat from the disc rotor, which often invites deterioration of grease as a lubricant and rubber constituting boots.

SUMMARY OF THE INVENTION

It is therefore a primary object of this invention to provide a disc brake wherein the slide pins are disposed at deviated places from direct exposure to the heat from the disc rotor while being made relatively short for allowing compact design for the disc brake.

According to the present invention there is provided a disc brake comprising (1) a disc rotor, (2) a pair of pad assemblies, inner and outer, disposed on either side of said disc rotor, (3) a stationary torque receiving member supporting said pair of pad assemblies slidably in the axial direction of said disc rotor, (4) a caliper provided with a fluid pressure cylinder portion and a reaction portion oppositely disposed to said cylinder portion, and straddling said pair of pad assemblies and said disc rotor for urging the former onto the latter, (5) four slide pins erected from said torque receiving member, one pair on either side of said disc rotor, and fitted into respective fit-bores formed in said caliper, (6) two oppositely erected slide pins being positioned coaxially to each other, (7) at least one of said pair of slide pins disposed on the side of said cylinder portion being made into a main slide pin for chiefly regulating the shifting direction of said caliper, and (8) the remaining slide pins of the four being respectively made into auxiliary slide pins with less regulating capability of the shifting direction than said main slide pin.

For the purpose of diminishing the regulating capability some ideas are preferable, such as decreasing the rigidity of the slide pin itself, making the clearance at the fit-bore for the slide pin larger, making the length of the fitting smaller, and inserting a bush of rubber, for example, between the fit-bore and the slide pin.

In the disc brake in accordance with this invention the caliper is retained on either side of the disc rotor with the slide pins, as described above, so as to be stable even when each of the slide pins is relatively short. A large size disc brake may be designed compactly because of this type caliper. Particularly the design wherein only one of the four slide pins is made a main slide pin, leaving the remaining three to be auxiliary pins, allows a relatively broad tolerance with respect to precision of the relative position and the relative parallelism among the slide pins, while satisfactorily keeping smooth sliding of the caliper. It enables economization of the manufacturing cost of the caliper, in addition to enabling easy replacement of the worn pads without subjecting the slide pins to large bending forces or scratching, because the caliper may be turned with support by plural slide pins disposed on either side of the disc rotor, not with support by only one slide pin on one side of the disc rotor as in ordinary cases. Another advantage lies in that the slide pins are disposed at positions away from the disc rotor, which protects the slide pins from the heat of the disc rotor produced upon braking. Deterioration of the lubricating oil and the boots can also be avoided by the above-mentioned protection from the heat of the disc rotor.

DETAILED DESCRIPTION OF THE PREFERRED EMBODIMENT

With reference to the appended drawings a preferred embodiment will be described hereunder.

Figure 1:
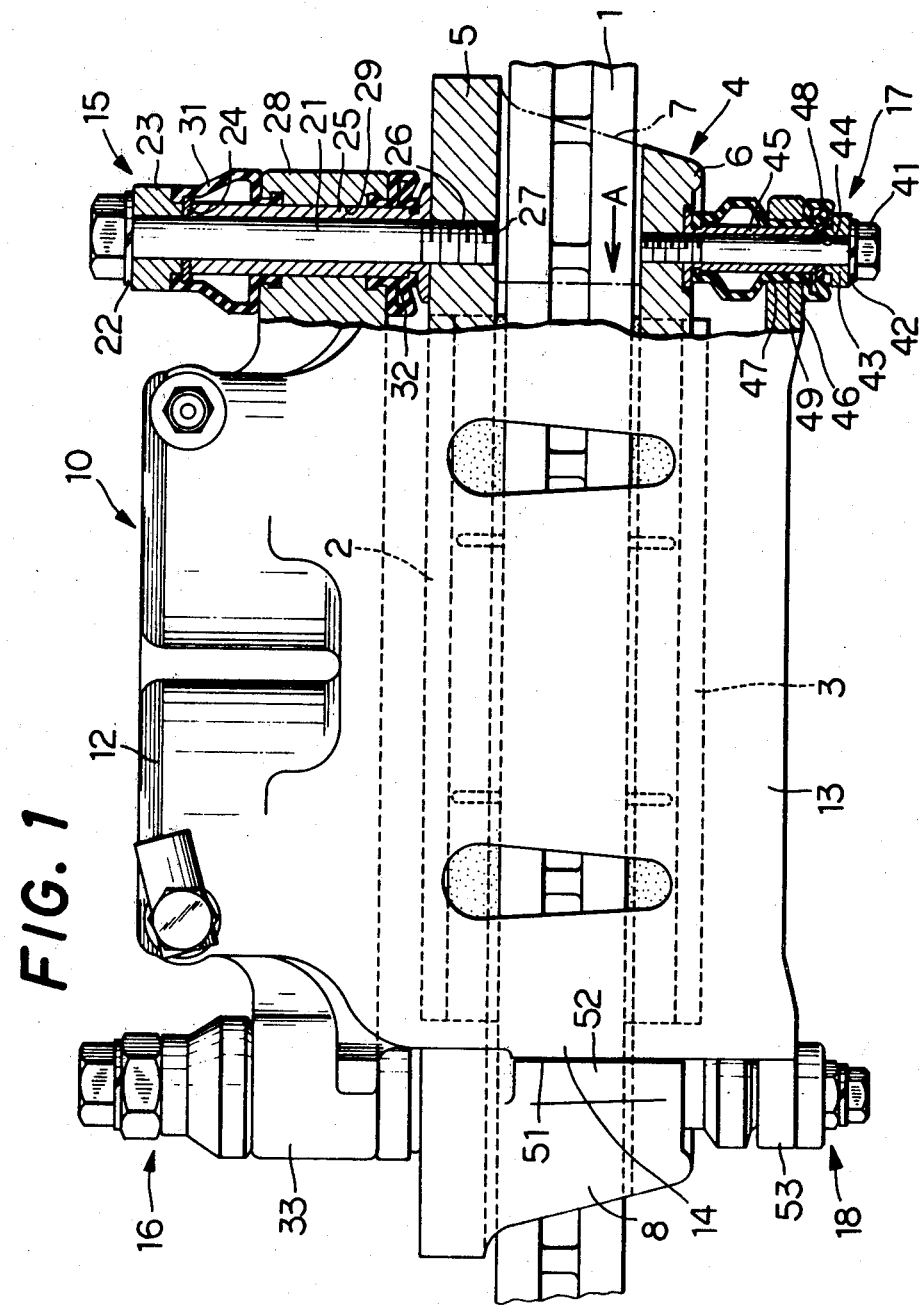
FIG. 1 is a plan view, partly broken away, of an embodiment of a disc brake in accordance with this invention.
Figure 2:
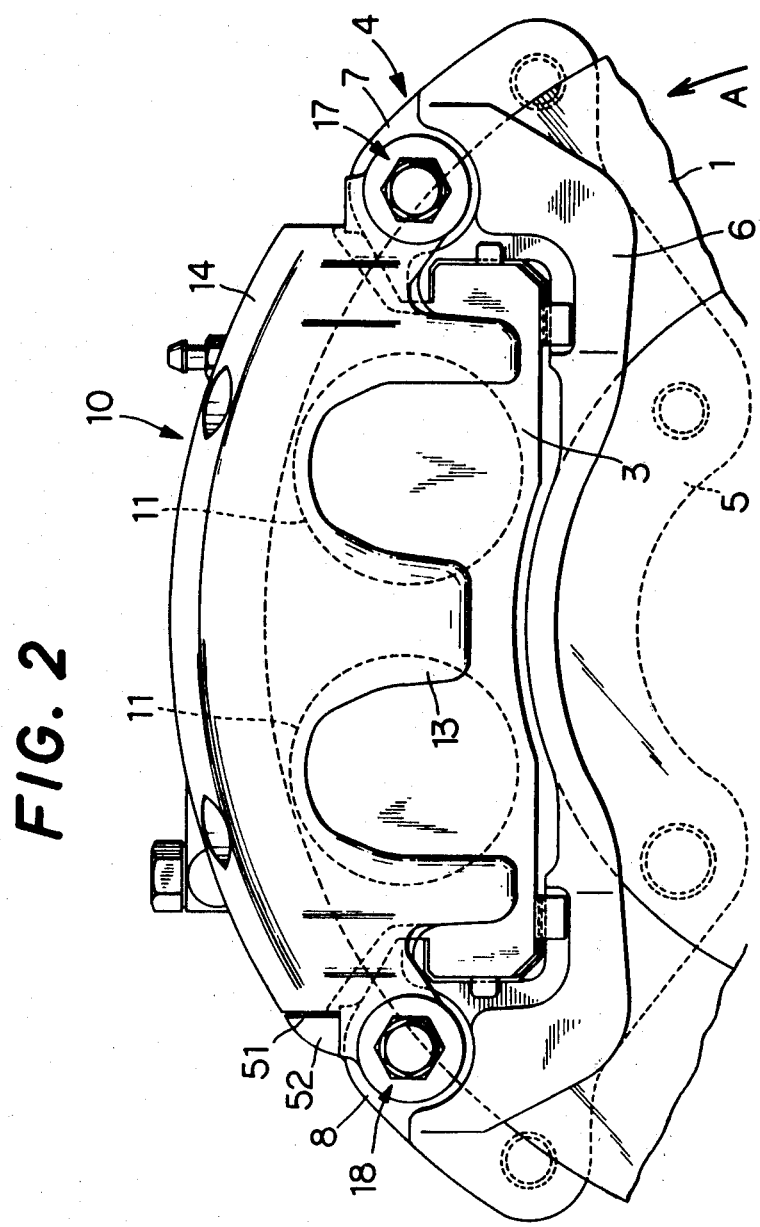
FIG. 2 is an elevational view of the embodiment of FIG. 1.

On opposite sides of a disc rotor 1, as shown in FIG. 1, an inner pad 2 and an outer pad 3 are disposed under the support of a stationary torque member 4 (more exactly a torque receiving member). The torque member 4 consists of a flat plate portion 5 secured to a non-rotatable member, another flat plate portion 6 oppositely faced to the former with the disc rotor 1 sandwiched inbetween, and a pair of connecting portions 7, 8 for connecting or bridging the flat plate portions 5, 6 across the outer periphery of the disc rotor 1. The pads 2, 3 are so fitted, as can be seen in FIG. 2, in a pad-accommodating recess respectively formed in each flat plate portion 5, 6 as to be movable in a parallel direction to the axis of the disc rotor 1.

A caliper 10 is mounted straddling over the disc rotor 1 and the pads 2, 3. The caliper 10 consists of a cylinder portion 12 wherein a pair of pistons 11 are parallelly disposed (see FIG. 2), a reaction portion 13 formed in opposition to the cylinder portion 12, and a bridge portion 14 for bridging the cylinder portion 11 and the reaction portion 13. When fluid pressure is applied to the cylinder portion 12 the pistons 11 urge the inner pad 2 onto one surface of the disc rotor 1, and a resultant reactionary force causes the reaction portion 13 to urge the outer pad 3 onto the other surface of the disc rotor 1.

The caliper 10 is, for performing the above-mentioned operation, movably retained by four slide pins 15, 16, 17, and 18 in a parallel direction to the axis of the disc rotor 1. The slide pin 15 is constituted of a bolt 21, and members fitted thereon, i.e., a spring washer 22, an anti-rotation member 23, a seal plate 24, and a sleeve 25 having a slide surface thereon respectively fitted on the bolt 21, all of those fitted members being fastened by threading a male screw portion 26 on the end portion of the bolt 21 into a tapped bore 27 formed in the flat plate portion 5 of the torque member 4. On the sleeve 25 an alarm portion 28 projected from the cylinder portion 12 of the caliper 10 is fitted at a fit-bore 29 formed therein with a slight clearance, and the projected portion of the sleeve 25 extending out of the arm portion 28 is covered by boots 31 and 32. The anti-rotation member 23 of hexagonal section, capable of being engaged with an anti-rotation tool such as a spanner, is for preventing the sleeve 25 from being rotated upon threading of the bolt 21 into the tapped bore 27, so that the boots 31, 32 may not be twisted. The seal plate 24 which is made of a relatively soft material such as copper and sandwiched between end surfaces of the sleeve 25 and the anti-rotation member 23 functions to prevent leakage of lubricant such as grease from between the anti-rotation member 23 and the sleeve 25 and ingress of water from outside into the interior of the boot 31, and the seal plate 24 concurrently functions as a flange for being engaged by an inward flange of the boot 31.

The slide pin 16 is disposed at a symmetrical position with the slide pin 15 in relation to the center line of the caliper 10 and is of the entirely same structure, excepting that a clearance, between the fit-bore (not shown) in an arm portion 33 and the sleeve, is made slightly larger than that in the slide pin 15. The reason for this difference in the size of the clearance lies in making the capability of regulating the moving direction of the caliper 10 somewhat smaller in the slide pin 16 than in the slide pin 15. In other words, the slide pin 15 works as the main pin and the slide pin 16 as a sub-pin or an auxiliary pin.

The slide pins 17 and 18 are respectively disposed coaxially with the slide pins 15 and 16 and are oppositely located with respect to slide pins 15 and 16, with the disc rotor 1 sandwiched inbetween. The slide pin 17 is similar in structure to slide pin 15 but is of reduced size with respect thereto and is constituted of a bolt 41, a spring washer 42, an anti-rotation member 43, a seal plate 44, and a sleeve 45. On the sleeve 45 an arm portion 46 projected from the reaction portion 13 is fitted at a fit-bore 47 formed therein. Between the sleeve 45 and the fit-bore 47 an intermediate portion of a boot 48 is interposed for functioning as a rubber bush 49. Elastic deformation of the rubber bush 49 permits a minute movement of the arm portion 46 in a perpendicular direction to the axis of the slide pin 17. The slide pin 17 is also made as an auxiliary pin with smaller capability of regulating the moving direction of the caliper 10 than that of the slide pin 15. The slide pin 18 with the completely same structure as slide pin 17 also functions as an auxiliary pin. The disc rotor 1 is rotated in a direction indicated with an arrow A in FIGS. 1 and 2, and the slide pin 15 as the main pin is located on the side of the cylinder portion 12 of the caliper 10, and more particularly at a position where a given portion of the disc rotor 1 first approaches in rotation towards the caliper 10. On the connecting portion 8 of the torque member 4 a stopper 52 is erected in the form of a projection opposed to a side surface 51 of the bridge portion 14 of the caliper 10 where a given portion on the disc rotor 1 in rotation goes away from the caliper 10. The stopper 52, during the non-operation time of the disc brake is slightly kept away from the side surface 51 of the caliper 10, but it meets the side surface 51 when the caliper 10 is leftwardly (see FIGS. 1 and 2) moved by the rotational force of the disc rotor 1 so as to prevent the caliper 10 from further rotating together with the disc rotor 1. At this time a slight movement of the caliper 10 can be permitted, viz., absorbed by the elastic deformation of the rubber bush 49 sandwiched between the slide pins 17, 18 and the arm portions 46, 53 as well as the clearance between the slide pin 16 and the arm portion 33.

When the pads 2 and 3 must be replaced after the use thereof for a certain period of time, the boot is removed from the torque member 4 at each of the slide pins 16, 18. Then, the caliper 10 may be rotated by assuming its center at the slide pins 15 and 17. The pads 2 and 3 can be easily removed for the replacement in this condition where the caliper 10 is out of the straddling posture over the pads 2, 3. The caliper 10 is in this situation turned or rotated, with the cylinder portion 12 and the reaction portion 13 being supported by the slide pins 15 and 17, so the fitting portion of the slide pin 15 and the arm portion 28 can never be affected by scratching due to sliding under local high contact pressure, even in case of a large size caliper of heavy type. The guide surface (external peripheral surface) of the slide pin 15 will be well protected from damage.

As the slide pins 15, 16, 17, and 18 are all in this embodiment disposed on the flat plate portions 5, 6 of the torque member 4 and the end of the bolts 21, 41, etc., are restricted not to protrude to the side of the disc rotor 1, the diameter of the disc rotor 1 is allowed to be increased as far as a position where the slide pin and the disc rotor 1 seem to be mutually interfered in the frontal view thereof, as shown in FIG. 2, without any actual interference of the two. Thus the diameter of the disc rotor 1 can be enlarged as desired.

Making one of the four slide pins to be main, leaving the remaining three as sub or auxiliary ones in this embodiment, permits the tolerance for the precision of the relative position as well as the parallelism among those pins to be comparatively broad, without fear of inviting any hitch to the smooth sliding of the caliper. This contributes to economization of the manufacturing cost.

Making both slide pins 15, 16 on the side of the cylinder portion 12 into main slide pins, instead of only one of them, is possible. In this case it is preferable to make the clearance between the slide pins 15, 16 and the fit-bores of the arm portions 28, 33 slightly larger, for example to approx. 0.27 mm in radius, than that in the slide pin 15 as the main pin in the above embodiment so as effectively to absorb errors in manufacturing by both pins 15, 16.

It is also permissible to insert a sleeve of sintered metal impregnated with lubricating oil or fat in the fit-bores of the arm portions 28, 33, 46, and 53 so as to improve the lubrication capability. In this instance it is advisable to make the clearance between the sleeves and the slide pins 17, 18 on the side of the reaction portion 13 larger than that on the side of the cylinder portion 12, for example, to the extent of 0.37 mm in radius.

What is claimed is:

1. A disc brake comprising:
   a disc rotor;
   a pair of pad assemblies disposed on opposite first and second sides of said disc rotor;
   a stationary torque receiving member including first and second plate portions disposed on said first and second sides of the disc rotor respectively and supporting said pair of pad assemblies slidably in a direction parallel to the axis of rotation of said disc rotor, said torque receiving member further including a pair of connecting portions connecting said plate portions across the outer periphery of said disc rotor;

a caliper including a fluid pressure cylinder portion facing one of said pad assemblies disposed on said first side of the disc rotor, a reaction portion facing the other of said pad assemblies disposed on said second side of the disc rotor, and a bridge portion connecting said cylinder portion and said reaction portion, said caliper straddling said pair of pad assemblies, said plate portions of the torque receiving member and said disc rotor for urging said pad assemblies onto opposite surfaces of said disc rotor on said first and second sides; and first, second, third and fourth slide pins supporting said caliper slidably along said axis of rotation and partly fitted in first, second, third and fourth fit-bores respectively, said first and second slide pins extending from said first plate portion axially outwardly of said disc rotor and said third and fourth slide pins extending from said second plate portion axially outwardly of said disc rotor, said first and third slide pins being disposed co-axially with each other and constituting a first pair, said second and fourth slide pins being disposed co-axially with each other and constituting a second pair, each one of at least said first pair of slide pins including a sleeve and a bolt, said bolt being fixed at one end thereof to the respective one of said first and second plate portions and having at the other end thereof an easily accessible head engageable with a wrench tool to remove said bolt to pivot said caliper about said second pair of slide pins for replacement of said pad assemblies, at least one of said first and second slide pins acting as a main slide pin which chiefly controls orientation of said caliper relative to said torque receiving member and the remaining slide pins each acting as an auxiliary slide pin which has less caliper orientation capability than said main pin.

2. A disc brake as claimed in claim 1, wherein said first and second slide pins disposed on said first side of said disc rotor and said first and second fit-bores are longer than said third and fourth slide pins disposed on said second side of said disc rotor.

3. A disc brake as claimed in claim 1, wherein said first slide pin is spaced from said second slide pin circumferentially of said disc rotor, said main slide pin being that one of said first and second slide pins which is located at a position of said first plate portion which is approached by a given portion of the disc rotor during rotation thereof earlier than a position at which said second slide pin is located.

4. A disc brake as claimed in claim 3, wherein a clearance between said first slide pin and said first fit-bore is smaller than that between said second slide pin and said second fit-bore.

5. A disc brake as claimed in claim 1, wherein a rubber bush is disposed between said third and fourth fit-bores and said third and fourth slide pins respectively.

6. A disc brake as claimed in claim 5, said third and fourth slide pins each having a boot covering a part thereof, an intermediate portion of said boot being interposed between each of said third and fourth slide pins and the corresponding fit-bore, said intermediate portion functioning as said rubber bush.

7. A disc brake as claimed in claim 1, wherein at least one of said first, second, third and fourth slide pins comprises a sleeve having a sliding surface, an anti-rotation member engageable with an anti-rotation tool, a seal member sandwiched between end surfaces of said sleeve and said anti-rotation member, and a bolt inserted through said sleeve, said anti-rotation member and said seal member, said bolt being threaded into a tapped bore in said torque receiving member.

8. A disc brake as claimed in claim 7, wherein said at least one of said first, second, third and fourth slide pins further comprises a boot covering the sliding surface of said sleeve and having an inward flange, said seal member engaging said inward flange of said boot covering said sliding surface of said sleeve for fixing one end of said boot to said at least one of said first, second, third and fourth slide pins.

9. A disc brake as claimed in claim 1, wherein said cylinder portion is provided with two cylinder bores disposed in parallel and two pistons respectively fitted therein.

10. A disc brake as claimed in claim 1, wherein said torque receiving member includes a stopper and said bridge portion includes a side surface, said stopper abutting on said side surface to prevent said caliper from rotating circumferentially of said disc rotor more than a predetermined amount during braking operation.

11. A disc brake as claimed in claim 1, wherein said first and second slide pins are said main slide pins.

12. A disc brake as claimed in claim 11, wherein a clearance between said third and fourth slide pins and said third and fourth fit-bores is greater than that between said first and second slide pins and said first and second fit-bores.

13. A disc brake as claimed in claim 1, wherein said first and second slide pins are respectively greater in diameter than said third and fourth slide pins.

14. A disc brake as claimed in claim 1, wherein said first, second, third and fourth slide pins are each covered by at least one boot at portions thereof outside said first, second, third and fourth fit-bores.

15. A disc brake comprising:
a disc rotor;
a pair of pad assemblies disposed on opposite first and second sides of said disc rotor;
a stationary torque receiving member including first and second plate portions disposed on said first and second sides of the disc rotor respectively and supporting said pair of pad assemblies slidably in a direction parallel to the axis of rotation of said disc rotor, said torque receiving member further including a pair of connecting portions connecting said plate portions across the outer periphery of said disc rotor;
a caliper including a fluid pressure cylinder portion facing one of said pad assemblies disposed on said first side of the disc rotor, a reaction portion facing the other of said pad assemblies disposed on said second side of the disc rotor, and a bridge portion connecting said cylinder portion and said reaction portion, said caliper straddling said pair of pad assemblies, said plate portions of the torque receiving member and said disc rotor for urging said pad assemblies onto opposite surfaces of said disc rotor on said first and second sides; and first, second, third and fourth slide pins supporting said caliper slidably along said axis of rotation and partly fitted in first, second, third and fourth fit-bores respectively, and each having at least one boot covering portions thereof outside the respective fit-bores, said first and second slide pins extending from said first plate portion axially outwardly of said disc rotor, said third and fourth slide pins extending from said second plate portion axially outwardly of said disc rotor and shorter and smaller in diameter than said first and second slide pins, said first and third slide pins being disposed co-axially with each other and constituting a first pair, said second and fourth slide pins being disposed co-axially with each other and constituting a second pair, each one of at least said first pair of slide pins including a sleeve and a bolt, said bolt being fixed at one end thereof to the respective one of said first and second plate portions and having at the other end thereof an easily accessible head engageable with a wrench tool to remove said bolt to circumferentially turn said caliper about said second pair of slide pins for replacement of said pad assemblies, at least one of said first and second slide pins acting as a main slide pin which chiefly controls orientation of said caliper relative to said torque receiving member and the remaining slide pins each acting as an auxiliary slide pin which has less caliper orientation capability than said main slide pin.

16. A disc brake as claimed in claim 15, wherein both of said first and second slide pins act as main slide pins.

* * * * *